(12) United States Patent
Shibuya

(10) Patent No.: US 7,990,616 B2
(45) Date of Patent: Aug. 2, 2011

(54) IR-UV CUT MULTILAYER FILTER WITH DUST REPELLENT PROPERTY

(75) Inventor: Munehiro Shibuya, Kamiina-gun (JP)

(73) Assignee: Epson Toyocom Corporation, Tokyo (JP)

(*) Notice: Subject to any disclaimer, the term of this patent is extended or adjusted under 35 U.S.C. 154(b) by 215 days.

(21) Appl. No.: 12/272,153

(22) Filed: Nov. 17, 2008

(65) Prior Publication Data

US 2009/0128936 A1 May 21, 2009

(30) Foreign Application Priority Data

Nov. 16, 2007 (JP) ................................. 2007-297611
Aug. 5, 2008 (JP) ................................. 2008-201556

(51) Int. Cl.
*G02B 5/22* (2006.01)
*B05D 5/12* (2006.01)

(52) U.S. Cl. ........................................ 359/582; 359/588
(58) Field of Classification Search .................. 359/359, 359/580, 582, 586–590
See application file for complete search history.

(56) References Cited

U.S. PATENT DOCUMENTS

| | | | | |
|---|---|---|---|---|
| 5,989,693 | A * | 11/1999 | Yamasaki et al. | 428/216 |
| 6,649,271 | B2 * | 11/2003 | Taruishi | 428/447 |
| 7,483,212 | B2 * | 1/2009 | Cho et al. | 359/586 |
| 7,684,113 | B2 * | 3/2010 | Yamada et al. | 359/359 |
| 2006/0029818 | A1 * | 2/2006 | Suzuki et al. | 428/447 |
| 2007/0229945 | A1 | 10/2007 | Shibuya | |
| 2008/0085418 | A1 * | 4/2008 | Fukuda et al. | 428/447 |

FOREIGN PATENT DOCUMENTS

| | | | |
|---|---|---|---|
| EP | 933377 A2 * | 8/1999 | |
| JP | 09111223 A * | 4/1997 | |
| JP | A-2004-233501 | 8/2004 | |
| JP | A-2007-298951 | 11/2007 | |

* cited by examiner

*Primary Examiner* — Mark Consilvio
(74) *Attorney, Agent, or Firm* — Oliff & Berridge, PLC

(57) ABSTRACT

An optical multilayer filter having an inorganic thin film composed of a plurality of layers on a substrate includes a fluorinated organic silicon compound film formed on a surface of the inorganic thin film, a low-density formation section forming a part of the inorganic thin film, having one or more layers including the most superficial layer of the inorganic thin film, the one or more layers being formed of at least one of a low-density titanium oxide layer and a low-density silicon oxide layer, and a high-density formation section forming another part of the inorganic thin film, disposed between the low-density formation section and the substrate, having silicon oxide layers with a density higher than the low-density silicon oxide layer and titanium oxide layers with a density higher than the low-density titanium oxide layer in a stacked manner. A total thickness of the low-density formation section is equal to or smaller than 280 nm.

8 Claims, 9 Drawing Sheets

| | CONDITIONS OF FORMING INORGANIC THIN FILM | | | | | EVALUATION RESULTS | | | | | | | |
|---|---|---|---|---|---|---|---|---|---|---|---|---|---|
| | SiO₂ (2L30) | | | FLUORINATED ORGANIC SILICON COMPOUND | DENSITY OF LOW-DENSITY SiO₂ (g/cm³) | BEFORE WIPING TEST | | | AFTER WIPING TEST | | | SHEET RESISTANCE (Ω/sq) | SURFACE POTENTIAL (V) |
| | ACCELE-RATION VOLTAGE (V) | ACCELE-RATION CURRENT (mA) | DEGREE OF VACUUM (Pa) | | | ELECTRO-STATIC (ATTACH-MENT COUNT) | AIR BLOW (ATTACH-MENT COUNT) | CONTACT ANGLE (°) | ELECTRO-STATIC (ATTACH-MENT COUNT) | AIR BLOW (ATTACH-MENT COUNT) | CONTACT ANGLE (°) | | |
| SPECIFIC EXAMPLE 1 | 0 | 0 | 0.0005 | PRESENT | 2.048 | 253 | 31 | 110 | 260 | 30 | 106 | 1.10E+12 | 120 |
| SPECIFIC EXAMPLE 2 | 0 | 0 | 0.0010 | PRESENT | 2.043 | 246 | 27 | 109 | 255 | 22 | 104 | 8.80E+11 | 114 |
| SPECIFIC EXAMPLE 3 | 0 | 0 | 0.0030 | PRESENT | 2.045 | 201 | 22 | 110 | 253 | 24 | 105 | 6.80E+11 | 110 |
| SPECIFIC EXAMPLE 4 | 0 | 0 | 0.0100 | PRESENT | 2.016 | 167 | 15 | 108 | 185 | 18 | 104 | 4.00E+11 | 91 |
| SPECIFIC EXAMPLE 5 | 0 | 0 | 0.0300 | PRESENT | 1.995 | 118 | 19 | 109 | 144 | 20 | 104 | 2.30E+11 | 85 |
| SPECIFIC EXAMPLE 6 | 0 | 0 | 0.0500 | PRESENT | 1.981 | 111 | 12 | 107 | 120 | 11 | 103 | 1.50E+11 | 82 |
| COMPARATIVE EXAMPLE 1 | 1000 | 1200 | 0.0005 | PRESENT | | | | | | | | | |
| COMPARATIVE EXAMPLE 2 | 1000 | 1200 | 0.0010 | PRESENT | | | | | | | | | |
| COMPARATIVE EXAMPLE 3 | 1000 | 1200 | 0.0030 | PRESENT | | | | | | | | | |
| COMPARATIVE EXAMPLE 4 | 1000 | 1200 | 0.0100 | PRESENT | 2.221 | 528 | 175 | 111 | 538 | 258 | 72 | 1.00E+15 OR HIGHER | 2150 |
| COMPARATIVE EXAMPLE 5 | 1000 | 1200 | 0.0300 | PRESENT | 2.213 | 535 | 158 | 110 | 544 | 263 | 68 | 1.00E+15 OR HIGHER | 2070 |
| COMPARATIVE EXAMPLE 6 | 1000 | 1200 | 0.0500 | PRESENT | 2.201 | 530 | 142 | 112 | 541 | 251 | 67 | 1.00E+15 OR HIGHER | 2100 |
| COMPARATIVE EXAMPLE 7 | 0 | 0 | 0.0005 | ABSENT | 2.048 | 284 | 103 | 48 | | | | 1.20E+12 | 125 |
| COMPARATIVE EXAMPLE 8 | 0 | 0 | 0.0010 | ABSENT | 2.043 | 288 | 93 | 49 | | | | 8.50E+11 | 111 |
| COMPARATIVE EXAMPLE 9 | 0 | 0 | 0.0030 | ABSENT | 2.045 | 234 | 90 | 47 | | | | 6.40E+11 | 105 |
| COMPARATIVE EXAMPLE 10 | 0 | 0 | 0.0100 | ABSENT | 2.016 | 198 | 75 | 45 | | | | 4.30E+11 | 94 |
| COMPARATIVE EXAMPLE 11 | 0 | 0 | 0.0300 | ABSENT | 1.995 | 141 | 64 | 42 | | | | 2.40E+11 | 89 |
| COMPARATIVE EXAMPLE 12 | 0 | 0 | 0.0500 | ABSENT | 1.981 | 125 | 58 | 44 | | | | 1.30E+11 | 84 |
| COMPARATIVE EXAMPLE 13 | 1000 | 1200 | 0.0005 | ABSENT | | | | | | | | | |
| COMPARATIVE EXAMPLE 14 | 1000 | 1200 | 0.0010 | ABSENT | | | | | | | | | |
| COMPARATIVE EXAMPLE 15 | 1000 | 1200 | 0.0030 | ABSENT | | | | | | | | | |
| COMPARATIVE EXAMPLE 16 | 1000 | 1200 | 0.0100 | ABSENT | 2.221 | 547 | 316 | 51 | | | | 1.00E+15 OR HIGHER | 2200 |
| COMPARATIVE EXAMPLE 17 | 1000 | 1200 | 0.0300 | ABSENT | 2.213 | 564 | 294 | 52 | | | | 1.00E+15 OR HIGHER | 2100 |
| COMPARATIVE EXAMPLE 18 | 1000 | 1200 | 0.0500 | ABSENT | 2.201 | 551 | 262 | 54 | | | | 1.00E+15 OR HIGHER | 2120 |

FIG. 5

| | CONDITIONS OF FORMING SiO₂ FILM | | | DENSITY OF SiO₂ (g/cm³) | ADHESION EVALUATION RESULTS |
|---|---|---|---|---|---|
| | ACCELERATION VOLTAGE (V) | ACCELERATION CURRENT (mA) | DEGREE OF VACUUM (Pa) | | |
| SAMPLE 1 | 0 | 0 | 0.0005 | 2.048 | A |
| SAMPLE 2 | 0 | 0 | 0.0010 | 2.043 | A |
| SAMPLE 3 | 0 | 0 | 0.0030 | 2.045 | A |
| SAMPLE 4 | 0 | 0 | 0.0100 | 2.016 | A |
| SAMPLE 5 | 0 | 0 | 0.0300 | 1.995 | A |
| SAMPLE 6 | 0 | 0 | 0.0500 | 1.981 | A |

FIG. 6

|  | CONDITIONS OF FORMING TiO$_2$ FILM | | | DENSITY OF TiO$_2$ (g/cm$^3$) | ADHESION EVALUATION RESULTS |
| --- | --- | --- | --- | --- | --- |
|  | ACCELERATION VOLTAGE (V) | ACCELERATION CURRENT (mA) | DEGREE OF VACUUM (Pa) | | |
| SAMPLE 11 | 1000 | 1200 | 0.035 | 4.890 | A |
| SAMPLE 12 | 0 | 0 | 0.014 | 4.453 | A |
| SAMPLE 13 | 0 | 0 | 0.030 | 4.244 | A |
| SAMPLE 14 | 0 | 0 | 0.040 | 4.059 | B |
| SAMPLE 15 | 0 | 0 | 0.050 | 3.992 | C |

| | | CONDITIONS OF FORMING INORGANIC THIN FILM | | | | | | | | EVALUATION RESULTS | | | | | | | |
|---|---|---|---|---|---|---|---|---|---|---|---|---|---|---|---|---|---|
| | NUMBER OF LOW-DENSITY LAYERS | LOW-DENSITY $SiO_2$ | | | LOW-DENSITY $TiO_2$ | | | FLUORINATED ORGANIC SILICON COMPOUND | DENSITY OF LOW-DENSITY $SiO_2$ (g/cm³) | DENSITY OF LOW-DENSITY $TiO_2$ (g/cm³) | BEFORE WIPING TEST | | | AFTER WIPING TEST | | | SURFACE POTENTIAL (V) |
| | | ACCELERATION VOLTAGE (V) | ACCELERATION CURRENT (mA) | DEGREE OF VACUUM (Pa) | ACCELERATION VOLTAGE (V) | ACCELERATION CURRENT (mA) | DEGREE OF VACUUM (Pa) | | | | ELECTROSTATIC (ATTACHMENT COUNT) | AIR BLOW (ATTACHMENT COUNT) | CONTACT ANGLE (°) | ELECTROSTATIC (ATTACHMENT COUNT) | AIR BLOW (ATTACHMENT COUNT) | CONTACT ANGLE (°) | SHEET RESISTANCE (Ω/sq) |
| SPECIFIC EXAMPLE 3 | 1 | 0 | 0 | 0.0030 | — | — | — | PRESENT | 2.045 | — | 201 | 22 | 110 | 253 | 24 | 105 | 6.80E+11 | 110 |
| SAMPLE 21 | 2 | 0 | 0 | 0.0030 | 0 | 0 | 0.0140 | PRESENT | 2.045 | 4.453 | 186 | 20 | 109 | 199 | 22 | 105 | 4.30E+11 | 93 |
| SAMPLE 22 | 3 | 0 | 0 | 0.0030 | 0 | 0 | 0.0140 | PRESENT | 2.045 | 4.453 | 151 | 15 | 111 | 162 | 19 | 106 | 2.70E+11 | 88 |
| SAMPLE 23 | 4 | 0 | 0 | 0.0030 | 0 | 0 | 0.0140 | PRESENT | 2.045 | 4.453 | 109 | 13 | 109 | 111 | 10 | 104 | 1.59E+11 | 82 |
| SAMPLE 24 | 5 | 0 | 0 | 0.0030 | 0 | 0 | 0.0140 | PRESENT | 2.045 | 4.453 | 107 | 9 | 110 | 118 | 11 | 105 | 1.60E+11 | 81 |
| SAMPLE 25 | 6 | 0 | 0 | 0.0030 | 0 | 0 | 0.0140 | PRESENT | 2.045 | 4.453 | 99 | 8 | 110 | 112 | 9 | 105 | 1.55E+11 | 80 |
| SAMPLE 26 | 60 | 0 | 0 | 0.0030 | 0 | 0 | 0.0140 | PRESENT | 2.045 | 4.453 | 100 | 8 | 108 | 116 | 10 | 104 | 1.51E+11 | 81 |

IR-UV CUT MULTILAYER FILTER WITH DUST REPELLENT PROPERTY

BACKGROUND

1. Technical Field

The present invention relates to an optical multilayer filter, a method of manufacturing an optical multilayer filter, and an electronic apparatus incorporating an optical multilayer filter.

2. Related Art

As an optical multilayer filter, there are known a half mirror, an IR-cut filter, a low-pass filter, and so on, and these are frequently used in electronic apparatuses. The optical multilayer filters are each composed of a substrate and an inorganic thin film formed on the substrate by vapor deposition.

The inorganic thin film has a multilayer film structure having high-refractive-index films made of titanium oxide ($TiO_2$) or the like and low-refractive-index films made of silicon oxide ($SiO_2$) or the like stacked alternately. In general, since a silicon oxide film functioning as a protective film is formed as the most superficial layer of the inorganic thin film, the surface thereof does not have electrical conductivity, and is apt to be electrostatically charged. Therefore, the surface of the optical multilayer filter is apt to absorb dust, and the dust sometimes causes a harmful influence on the optical characteristic of an electronic apparatus incorporating the optical multilayer filter.

As an electrostatic countermeasure technique for a surface of a substrate provided with an inorganic thin film, there is known a case of providing a transparent electrically conductive film such as an Indium Tin Oxide (ITO) film to an outer surface of dust-repellent glass, for example. See JP-A-2004-233501. The transparent electrically conductive film has electrical conductivity without degrading the transparency of glass, thereby making it possible to effectively removing the electrostatic charged on the surface of the transparent electrically conductive film.

However, in the optical multilayer filters in which the optical characteristic of the film forming a surface of the multilayer film is important, if such a transparent electrically conductive film as described in JP-A-2004-233501 is formed on the surface, the optical characteristic of the optical multilayer filter itself might be varied.

Further, in the structure described above, although attachment of dust caused by static electricity can be reduced by reducing the static charge on the surface thereof, since the transparent electrically conductive film has the most superficial layer with a large amount of surface energy, the dust once attached thereto becomes hard to eliminate. Therefore, the structure described above is not considered to be enough as a structure for reducing attachment of dust and easily eliminating the dust once attached thereto.

SUMMARY

The invention has an advantage of providing a solution to at least a part of the problem described above, when embodied as aspects thereof described below.

An optical multilayer filter according to a first aspect of the invention, the optical multilayer filter has an inorganic thin film composed of a plurality of layers on a substrate. The optical multilayer filter includes a fluorinated organic silicon compound film formed on a surface of the inorganic thin film, a low-density formation section forming a part of the inorganic thin film, having one or more layers including the most superficial layer of the inorganic thin film, the one or more layers being formed of at least one of a low-density titanium oxide layer and a low-density silicon oxide layer, and a high-density formation section forming another part of the inorganic thin film, disposed between the low-density formation section and the substrate, having silicon oxide layers with a density higher than the low-density silicon oxide layer and titanium oxide layers with a density higher than the low-density titanium oxide layer in a stacked manner. The total thickness of the low-density formation section is equal to or smaller than 280 nm.

According to the first aspect of the invention, since the most superficial layer of the inorganic thin film, or a plurality of layers including the most superficial layer are included in the low-density formation section formed of at least either one of the low-density titanium oxide layer and the low-density silicon oxide layer, the insulating property of the most superficial layer of the inorganic thin film or the plurality of layers including the most superficial layer thereof is lowered (the conductivity is increased). Therefore, the charge caused on the surface by the electrostatic action can be migrated through the most superficial layer or the plurality of layers including the most superficial layer. By grounding the charge, it becomes difficult for the charge to accumulate on the most superficial surface of the optical multilayer filter, thus it becomes difficult for dust caused by electrostatic action to adhere to the surface. Further, by forming the low-density formation section to have a total thickness equal to or smaller than 280 nm, the surface dust resistant effect by the low-density layers can be obtained.

On the other hand, since the fluorinated organic silicon compound film is formed on the surface of the most superficial layer of the inorganic thin film, an amount of the surface energy is reduced, thus dust can be prevented from adhering to the surface, and the dust once attached to the surface becomes to be easily eliminated from the surface. Further, since the fluorinated organic silicon compound film thus formed is thin (<10 nm), and has a lower density compared to inorganic materials, it can easily conduct the charge to the lower layer, and have no influence on the spectral characteristic.

Further, if the density of the most superficial layer in the inorganic thin film is low, the surface area is increased (equivalent to increasing concavity and convexity microscopically), and the area to which the fluorinated organic silicon compound film is attached is increased. Therefore, the adhesion of the fluorinated organic silicon compound film is enhanced, and the durability of thereof is improved.

Although in the related art, the inorganic thin film composed of the low-density layers is apt to cause the wavelength shift and so on, in the configuration described above, since the high-density formation section is also formed in addition to the low-density formation section to form the inorganic thin film having the high optical quality by the high density formation section as well, the characteristics necessary for the optical multilayer filter such as low wavelength shift or low haze, and the dust resistant property can both be achieved.

In the optical multilayer filter described above, it is preferable that the low-density silicon oxide layer has a density in a range of 1.9 through 2.1 $g/cm^3$, the low-density titanium oxide layer has a density in a range of 4.1 through 4.8 $g/cm^3$, the most superficial layer of the inorganic thin film is formed of the low-density silicon oxide layer, and the number of layers of the low-density formation section is one of 2 through 4.

According to this configuration, the low-density silicon oxide layer has a density in a range of 1.9 through 2.1 $g/cm^3$, and the low-density titanium oxide layer has a density in a range of 4.1 through 4.8 $g/cm^3$, and in the low-density formation section, assuming that the most superficial layer is the first layer, since the low-density titanium oxide layer or the low-density silicon oxide layer is formed selectively in the second through fourth layers, as described above, the optical multilayer filter to which the dust caused by the electrostatic action hardly adheres, and moreover, which allows the dust once attached thereto to easily be eliminated therefrom can be obtained.

In the optical multilayer filter described above, it is preferable that the substrate is a glass substrate or a quartz substrate.

According to the first aspect of the invention, since the substrate is formed of the glass substrate, there can be obtained the optical multilayer filter including, for example, functions of the UV-IR cut filter and the IR cut filter configured as dust-proof glass having a dust repellent property for, for example, imaging element such as a charge-coupled device (CCD), and moreover integrated with a desired filter function. Further, since the substrate is formed of a quartz substrate, there can be obtained the optical low-pass filter including, for example, the functions of the VU-IR cut filter and the IR cut filter configured as, for example, an optical low-pass filter having a dust repellent property, and moreover integrated with a desired filter function. Further, the present embodiment can also be applied to formation of an antireflection film.

A method of manufacturing an optical multilayer filter according to a second aspect of the invention, the optical multilayer filter has a substrate. The method includes (a) forming at least one high-density titanium oxide layer and at least one high-density silicon oxide layer on a surface of the substrate in a stacked manner to form a high-density formation section, (b) forming, after step (a), at least either one of a low-density titanium oxide layer having a density lower than the high-density titanium oxide layer and a low-density silicon oxide layer having a density lower than the high-density silicon oxide layer on a surface of the high-density formation section by a vacuum evaporation method to form a low-density formation section so as to have the total thickness equal to or smaller than 280 nm, and (c) forming, after step (b), a fluorinated organic silicon compound film on a surface of the most superficial layer of the low-density formation section.

According to a method of manufacturing an optical multilayer filter of the second aspect of the invention, by forming at least either one of the low-density titanium oxide layer and the low-density silicon oxide layer is formed on the surface of the high-density formation section by the vacuum evaporation method, the low-density formation section forming the most superficial layer of the inorganic thin film or a plurality of layers including the most superficial layer can be obtained. Thus, the insulating property of the most superficial layer or the plurality of layers including the most superficial layer, which shows a high insulating property by nature, can be lowered. Therefore, the charge caused on the surface by the electrostatic action can be migrated through the most superficial layer or the plurality of layers including the most superficial layer. By grounding the charge, it becomes difficult for the charge to accumulate on the most superficial surface of the optical multilayer filter, thus the optical multilayer filter difficult for dust caused by electrostatic action to adhere to the surface thereof can be obtained. Further, by forming the low-density formation section to have a total thickness equal to or smaller than 280 nm, the advantage described above can be obtained.

Further, since the fluorinated organic silicon compound film is formed on the silicon oxide layer forming the most superficial layer of the inorganic thin film, an amount of the surface energy is reduced, thus dust can be prevented from adhering to the surface, and the dust once attached to the surface becomes to be easily eliminated from the surface. Since the film thickness of the fluorinated organic silicon compound film thus formed is small (<10 nm), and has a lower density compared to inorganic materials, it can easily conduct the charge to the lower layer, and have no influence on the spectral characteristic. Further, if the density of the silicon oxide layer of the most superficial layer in the inorganic thin film is low, the surface area of the silicon oxide layer is increased (equivalent to increasing concavity and convexity microscopically), and the area to which the fluorinated organic silicon compound film is attached is increased. Therefore, the adhesion of the fluorinated organic silicon compound film is enhanced, and the optical multilayer filter having the improved durability can be obtained.

In the method of manufacturing an optical multilayer filter described above, it is preferable that the low-density silicon oxide layer is formed to have a density in a range of 1.9 through 2.1 $g/cm^3$, the low-density titanium oxide layer is formed to have a density in a range of 4.1 through 4.8 $g/cm^3$, and the low-density formation section is formed selectively to have the number of layers of one of 2 through 4.

According to the method of manufacturing an optical multilayer filter of the second aspect, by forming the titanium oxide layer and the silicon oxide layer forming the low-density formation section by the vacuum evaporation method, the silicon oxide layer having a density of 1.9 through 2.1 $g/cm^3$ and the titanium oxide layer having a density of 4.1 through 4.8 $g/cm^3$ can be obtained. Further, assuming that the layer forming the most superficial layer is the first layer, since the low-density titanium oxide layer or the low-density silicon oxide layer is formed selectively in the range of the first through the fourth layers as the low-density forming section, as described above, the optical multilayer filter to which the dust caused by the electrostatic action hardly adheres, and moreover capable of allowing the dust once attached thereto to easily be eliminated therefrom can be obtained.

In the method of manufacturing an optical multilayer filter described above, it is preferable that pressure applied when forming the low-density silicon layer by the vacuum evaporation method is in a range of $5 \times 10^{-4}$ through $5 \times 10^{-2}$ Pa, and pressure applied when forming the low-density titanium layer by the vacuum evaporation method is in a range of $1.4 \times 10^{-2}$ through $3 \times 10^{-2}$ Pa.

According to the method of manufacturing an optical multilayer filter of the second aspect, by setting the pressure applied when forming the low-density silicon layer by the vacuum evaporation method to a range of $5 \times 10^{-4}$ through $5 \times 10^{-2}$ Pa, the low-density silicon oxide layer with a density of 1.9 through 2.1 $g/cm^3$ can be obtained. Further, by setting the pressure applied when forming the low-density titanium layer by the vacuum evaporation method to a range of $1.4 \times 10^{-2}$ through $3 \times 10^{-2}$ Pa, the low-density titanium oxide layer with a density of 4.1 through 4.8 $g/cm^3$ can be obtained.

An electronic apparatus according to a third aspect of the invention includes an optical multilayer filter having an inorganic thin film composed of a plurality of layers on a substrate and a fluorinated organic silicon compound film formed on a surface of the inorganic thin film. The inorganic thin film includes a low-density formation section forming a part of the inorganic thin film, having one or more layers including the most superficial layer of the inorganic thin film, the one or more layers being formed of at least one of a low-density titanium oxide layer and a low-density silicon oxide layer, and a high-density formation section forming another part of the inorganic thin film, disposed between the low-density formation section and the substrate, having silicon oxide layers with a density higher than the low-density silicon oxide layer and titanium oxide layers with a density higher than the low-density titanium oxide layer in a stacked manner. The total thickness of the low-density formation section is equal to or smaller than 280 nm.

According to the electronic apparatus of the third aspect of the invention, the optical multilayer filter has the inorganic thin film composed of a plurality of layers on the substrate and a fluorinated organic silicon compound film formed on a surface of the inorganic thin film. The inorganic thin film includes the low-density formation section forming a part of the inorganic thin film, having one or more layers including the most superficial layer of the inorganic thin film, the one or more layers being formed of at least one of a low-density titanium oxide layer and a low-density silicon oxide layer, and the high-density formation section is formed between the low-density formation section and the substrate with at least either one of the high-density silicon oxide layer and the high-density titanium oxide layer. The total thickness of the low-density formation section is equal to or smaller than 280 nm. Since the electronic apparatus incorporates the optical multilayer filter, the dust caused by the electrostatic action hardly adheres to the optical multilayer filter. Moreover, the dust once attached thereto can easily be eliminated, it can be leveraged as an electronic apparatus capable of suppressing the influence of dust including an imaging device such as a digital still camera or a digital video camera, a camera-equipped mobile phone, a camera-equipped personal computer, and so on.

In the electronic apparatus described above, it is preferable that the low-density silicon oxide layer is formed to have a density in a range of 1.9 through 2.1 g/cm$^3$, the low-density titanium oxide layer is formed to have a density in a range of 4.1 through 4.8 g/cm$^3$, and the number of layers of the low-density formation section is one of 2 through 4.

According to the electronic apparatus of the third aspect of the invention, the low-density silicon oxide layer has a density in a range of 1.9 through 2.1 g/cm$^3$, the low-density titanium oxide layer has a density in a range of 4.1 through 4.8 g/cm$^3$, and in the low-density formation section, assuming that the layer forming the most superficial layer is the first layer, since the low-density titanium oxide layer or the low-density silicon oxide layer is formed selectively in the range of first through fourth layers, and the electronic apparatus incorporates the optical multilayer filter, the dust caused by the electrostatic action hardly adheres to the optical multilayer filter, and moreover, the dust once attached thereto can easily be eliminated, it can be leveraged as an electronic apparatus capable of suppressing the influence of dust including an imaging device such as a digital still camera or a digital video camera, a camera-equipped mobile phone, a camera-equipped personal computer, and so on.

BRIEF DESCRIPTION OF THE DRAWINGS

The invention will now be described with reference to the accompanying drawings, wherein like numbers refer to like elements.

FIG. 5 is a diagram showing an evaluation result of an evaluation test 1.

FIG. 6 is a diagram showing a result of evaluation of the adhesion of a sample provided with an SiO$_2$ layer and preparation conditions of the film.

FIG. 7 is a diagram showing a result of evaluation of the adhesion of a sample provided with a low-density TiO$_2$ layer and preparation conditions of the film.

FIG. 8 is a diagram showing evaluation results of an evaluation test 2.

DESCRIPTION OF EXEMPLARY EMBODIMENTS

Hereinafter, an embodiment of the invention will be described with reference to the accompanying drawings. It should be noted that the present embodiment is an example of applying the invention to an optical multilayer filter (an UV-IR cut filter) transmitting light in the visible wavelength band, and having preferable reflection characteristic in the ultraviolet wavelength band shorter than a predetermined wavelength and the infrared wavelength band longer than another predetermined wavelength.

Configuration of Optical Multilayer Filter

Figure 1:
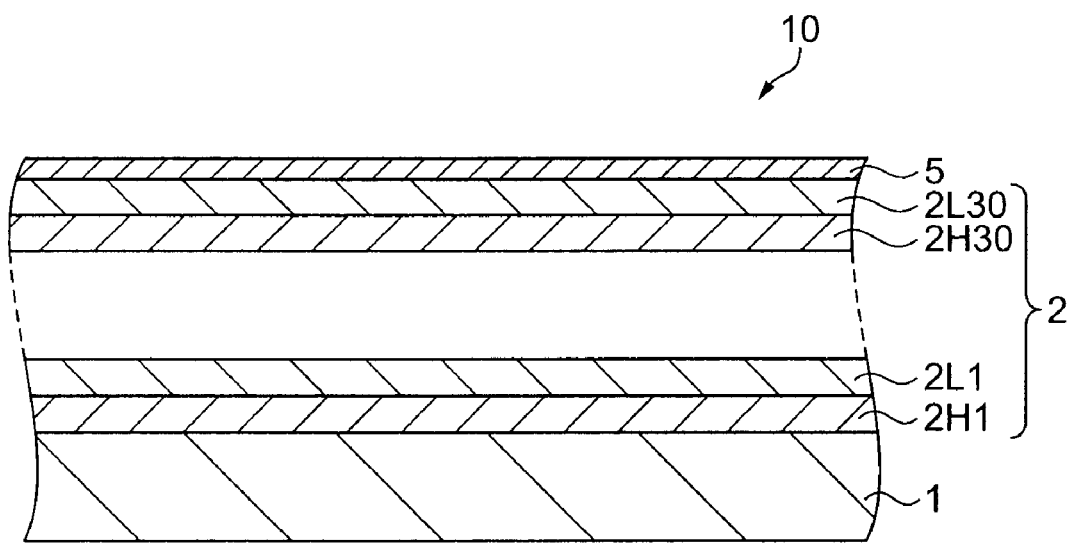
FIG. 1 is a cross-sectional view showing a configuration of an optical multilayer filter according to an embodiment of the invention.

FIG. 1 is a cross-sectional view schematically showing a configuration of the optical multilayer filter according to the present embodiment.

The optical multilayer filter 10 is configured including a glass substrate 1 as a substrate for transmitting light, a multilayer inorganic thin film 2, and a fluorinated organic silicon compound film 5.

Regarding the materials of the inorganic thin film 2, high-refractive-index layers (H) made of a high-refractive-index material are formed of TiO$_2$ layers (n=2.40) as titanium oxide layers, and low-refractive-index layers (H) made of a low-refractive-index material are formed of SiO$_2$ layers (n=1.46) as silicon oxide layers.

This inorganic thin film 2 is formed by firstly stacking a TiO$_2$ layer 2H1 of the high-refractive-index material, then stacking an SiO$_2$ layer 2H1 of the low-refractive-index material on the upper surface of the TiO$_2$ layer 2H1 of the high-refractive-index material thus stacked, in this order from the glass substrate 1 side. Thereafter, TiO$_2$ layers of the high-refractive-index material and SiO$_2$ layers of the low-refractive-index material are sequentially and alternately stacked on the upper surface of the SiO$_2$ layer 2L1 of the low-refractive-index material, and an SiO$_2$ layer 2L30 of the low-refractive-index material is stacked as the uppermost film layer, thereby forming the inorganic thin film 2 having 30 layers each, totally 60 layers.

Then, the configuration of the inorganic thin film 2 will be explained in detail.

In the description of a film thickness configuration explained hereinafter, values of optical film thickness nd=¼λ will be used. Specifically, the film thickness of the high-refractive-index layer (H) is described as 1H, and the film thickness of the low-refractive-index layer (L) is similarly described as 1L. Further, the description S in (xH, yH)S is the number of times of repetition called a stack count, and denotes that the structure in the parentheses is repeated periodically.

In the film thickness configuration (the optical film thickness) of the inorganic thin film 2, the design wavelength λ is 550 nm, the thickness of the $TiO_2$ layer 2H1 of the high-refractive-index material of the first layer is 0.60H, the thickness of the $SiO_2$ layer 2L1 of the low-refractive-index material of the second layer is 0.20L, thereafter in order, 1.05H, 0.37L, (0.68H, 0.53L)4, 0.69H, 0.42L, 0.59H, 1.92L, (1.38H, 1.38L)6, 1.48H, 1.52L, 1.65H, 1.71L, 1.54H, 1.59L, 1.42H, 1.58L, 1.51H, 1.72L, 1.84H, 1.80L, 1.67H, 1.77L, (1.87H, 1.87L)7, 1.89H, 1.90L, 1.90H, and the thickness of the $SiO_2$ layer 2L30 of the low-refractive-index material of the most superficial layer is 0.96L, thus totally 60 layers are formed.

Further, on the $SiO_2$ layer 2L30 of the most superficial layer of the inorganic thin film 2, the fluorinated organic silicon compound film 5 with a thickness of about 5 nm is formed by a vacuum evaporation method.

The optical multilayer filter 10 thus configured has the function as follows.

Figure 2:
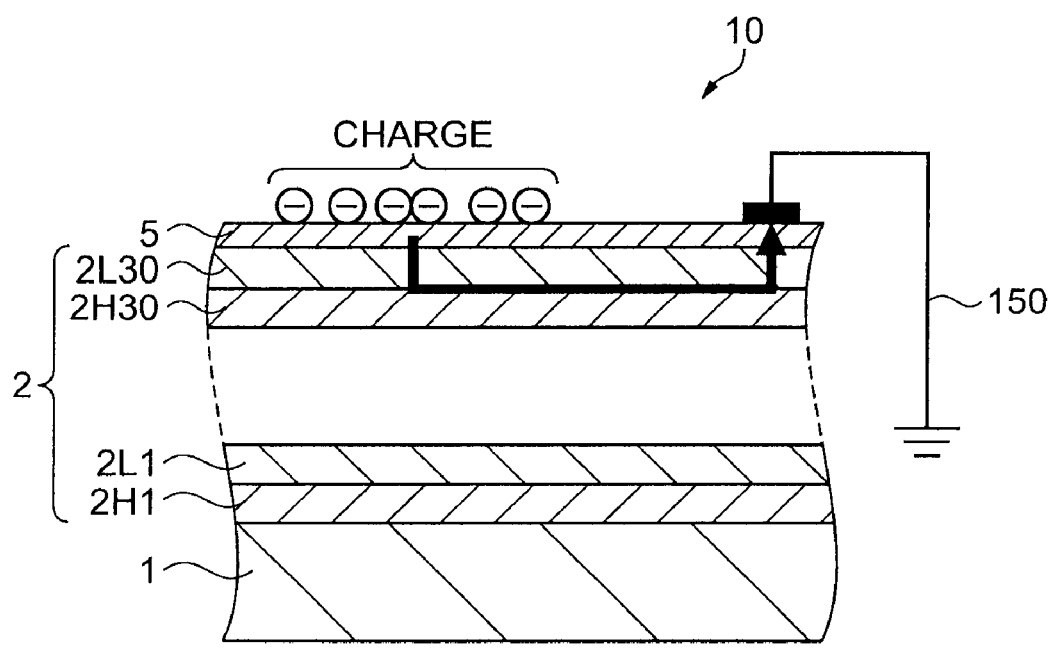
FIG. 2 is a cross-sectional view of the optical multilayer filter according to the present embodiment provided with a grounding wire.

FIG. 2 is a cross-sectional view of the optical multilayer filter provided with a grounding wire.

The thickness of the fluorinated organic silicon compound film 5 of the optical multilayer filter 10 is small, and the $SiO_2$ layer 2L30 formed under the fluorinated organic silicon compound film 5 is low in density and in a condition of a low insulation performance.

Therefore, the charge generated on the surface of the fluorinated organic silicon compound film 5 passes through the fluorinated organic silicon compound film 5 and the $SiO_2$ layer 2L30 to move to the $TiO_2$ layer 2H30. Since the $TiO_2$ layer 2H30 has lower resistance than $SiO_2$, it becomes possible for the charge to migrate in the $TiO_2$ layer 2H30. Further, by connecting the grounding wire 150 to the surface of the fluorinated organic silicon compound film 5, the charge can be released to the outside of the $TiO_2$ layer 2H30 passing through the $SiO_2$ layer 2L30 and the fluorinated organic silicon compound film 5 via the grounding wire 150.

Through the process described above, the amount of charge (the amount of electrostatic charge) generated on the surface of the fluorinated organic silicon compound film 5 in the optical multilayer filter 10 can be reduced.

Further, since the surface of the optical multilayer filter 10 is formed of the fluorinated organic silicon compound film 5 having small amount of surface energy, the dust once attached thereto can easily be eliminated.

Method of Manufacturing Optical Multilayer Filter

The method of manufacturing the optical multilayer filter will hereinafter be explained.

Firstly, the inorganic thin film 2 is formed on the glass substrate 1 by electron beam evaporation (so-called IAD method) using general ion assistance.

Specifically, after attaching the glass substrate 1 in a vacuum evaporation chamber (not shown), a crucible filled with an evaporation material is disposed in the lower part of the vacuum evaporation chamber, and the evaporation material is vaporized by electron beams. At the same time, by accelerated radiation with ionized oxygen (added with argon when forming TiO2 film) from an ion gun, the high-refractive-index material layers 2H1 through 2H30 made of $TiO_2$ and the low-refractive-index material layers 2L1 through 2L30 made of $SiO_2$ are formed as films on the glass substrate 1 alternatively with the film thickness configuration described above.

The conditions of forming the $SiO_2$ layers and the $TiO_2$ layers will hereinafter be described, and the high-density formation sections are formed under the following standard conditions.

Conditions (Standard Conditions) of Forming $SiO_2$ Layers
Film formation rate: 0.8 nm/sec
Acceleration voltage: 1000V
Acceleration current: 1200 mA
Oxygen ($O_2$) flow rate: 70 sccm
Film formation temperature: 150° C.
Conditions (Standard Conditions) of Forming $TiO_2$ Layers
Film formation rate: 0.3 nm/sec
Acceleration voltage: 1000V
Acceleration current: 1200 mA
Oxygen ($O_2$) flow rate: 60 sccm
Argon (Ar) flow rate: 20 sccm
Film formation temperature: 150° C.

It should be noted here that when forming the $SiO_2$ layer (2L30 in FIG. 1) as the most superficial layer of the inorganic thin film 2, the density is controlled by varying the pressure in the film formation apparatus under the conditions of setting the acceleration voltage and the acceleration current of the electron gun to 0 (zero) (by controlling the flow rate of the oxygen gas introduced therein). In other words, the formation of the $SiO_2$ layer of the most superficial layer is performed by a vacuum evaporation method other than the ion-assisted deposition. On this occasion, the pressure applied when forming the $SiO_2$ layer is in a range of $5 \times 10^{-4}$ through $5 \times 10^{-2}$ Pa. It should be noted that the $SiO_2$ layer formed by the vacuum evaporation method other than the ion-assisted deposition becomes an $SiO_2$ layer with lower density compared to the $SiO_2$ layer formed using the ion-assisted deposition method.

Subsequently, in order for achieving improvement of the adhesion between the $SiO_2$ layer (2L30 shown in FIG. 1) of the most superficial layer and the fluorinated organic silicon composition film (denoted with the reference numeral 5 shown in FIG. 1), a surface treatment is executed on the surface of the $SiO_2$ layer of the most superficial layer. Further, the fluorinated organic silicon compound film is formed on the surface of the $SiO_2$ layer of the most superficial layer on which the surface treatment has been executed. Finally, the optical multilayer filter 10 as shown in FIG. 1 can be obtained. The surface treatment of the $SiO_2$ layer of the most superficial layer is executed under the following conditions using the ion gun.

Surface Treatment Conditions of $SiO_2$ Layer
Oxygen ($O_2$) flow rate: 50 sccm
Acceleration voltage: 1000V
Acceleration current: 1000 mA
In-chamber temperature: 150° C.
Processing time: 3 minutes In the formation of the fluorinated organic silicon compound film, a material is obtained by, for example, solving and diluting a fluorinated organic silicon compound (the product mane: KY-130) produced by Shin-Etsu Chemical Co., Ltd with a fluorine solvent (Novec™ fluid HFE-7200 produced by 3M) to prepare a solution with a solid content density of 3%, and impregnating a pellet made of porous ceramics with 1 g of the prepared solution and drying the pellet impregnated with the solution, and the material is used as an evaporation source.

It should be noted that as the fluorinated organic silicon compound, a fluorinated organic silicon compound KP-801 (the product name) produced by Shin-Etsu Chemical Co., Ltd, a fluorinated organic silicon compound OPTOOL DSX (the product name) and DEMNUM™ series S-100 (the product name) produced by DAIKIN INDUSTRIES, Ltd., and so on can also be used besides the material described above.

In the film formation of the fluorinated organic silicon compound film 5, firstly the glass substrate 1 provided with the inorganic thin film 2 and the evaporation source are set inside the vacuum device, and vacuum air discharge is then executed. Then, the evaporation source is heated to be about 600° C. in the condition in which the temperature of the substrate is set to about 60° C. to evaporate the fluorinated organic silicon compound, to form a film on the substrate.

In the present embodiment, a vacuum evaporation apparatus having two chambers connected to each other under the low-pressure atmosphere is used, and the multilayer film formation of the inorganic thin film and surface treatment prior to the fluorinated organic silicon compound film formation are performed in one chamber, and the formation of the fluorinated organic silicon compound film is performed in the other chamber.

It should be noted that it is possible to use two separate apparatuses as the two chambers described above, or to perform the multilayer film formation of the inorganic thin film, surface treatment prior to the fluorinated organic silicon compound film formation, and the formation of the fluorinated organic silicon compound film in the same vacuum chamber.

Evaluation Test 1

In an evaluation test 1, a number of samples with different conditions of forming the SiO2 layer of the most superficial layer of the inorganic thin film 2 were formed, and the performance evaluation test of each of the samples (inorganic thin film 2) thus formed was performed.

In the formation of the samples, inorganic thin films 2 respectively having SiO2 layers of the most superficial layers with the formation conditions different between the samples were formed on the surface of a white plate glass (refractive index n=1.52) with a diameter of 30 mm and a thickness of 0.3 mm. The portion of each of the samples other than the $SiO_2$ layer of the most superficial layer was formed under the standard conditions described above, and the formation of the $SiO_2$ layer in the most superficial layer was performed while varying the pressure (the degree of vacuum) in the film formation apparatus by controlling the flow rate of the $O_2$ gas introducing therein.

In the formation of the samples, after forming the $SiO_2$ layers of the most superficial layers under the conditions in which the acceleration voltage and the acceleration current of the ion gun were set to 0 (zero), and the degree of vacuum in the film formation apparatus was set to 0.0005 Pa, 0.0010 Pa, 0.0030 Pa, 0.0100 Pa, 0.0300 Pa, and 0.0500 Pa, respectively, and the fluorinated organic silicon compound film was formed thereon by the process described above. The samples thus formed are referred to as specific examples 1 through 6 in this order.

In addition, samples obtained by forming the $SiO_2$ layers of the most superficial layers of the inorganic thin films 2 by operating (with the acceleration voltage of 1000V, and the acceleration current of 1200 mA) the ion gun in the conditions in which the gas was introduced so that the same pressures as in the specific examples 1 through 6 were achieved, and further forming the fluorinated organic silicon compound films on the surfaces of the $SiO_2$ layers were formed. The samples thus formed in the degrees of vacuum corresponding respectively to the specific examples 1 through 6 are referred to as comparative examples 1 through 6 in this order. It should be noted that since in the comparative examples 1 through 3, the pressures were too low to operate the ion gun, the $SiO_2$ films of the most superficial layers could not be formed.

Further, as comparative examples, samples without the fluorinated organic silicon compound films with respect to the specific examples 1 through 6 and the comparative examples 1 through 6 were formed. The samples corresponding to the specific examples 1 through 6 and the comparative examples 1 through 6 are referred to as comparative examples 7 through 18 in this order. It should be noted that since in the comparative examples 13 through 15, the pressures were too low to operate the ion gun, the $SiO_2$ films of the most superficial layers could not be formed.

The performance evaluations were executed on the samples of the specific examples 1 through 6, the comparative examples 1 through 6 and the comparative examples 7 through 18 with respect to the evaluation items of a wiping test, a surface resistance (sheet resistance) measurement, and a surface potential measurement. Further, evaluations by the density measurement of the $SiO_2$ films using separate samples having $SiO_2$ films formed on a Si wafer under the respective conditions of forming the $SiO_2$ films of the most superficial layers was additionally executed.

The evaluation method of each of the evaluation items will be described below.

Evaluation Methods

1. Wiping Test

In the wiping test, contact angle measurement, measurement of the number of beads attached thereto with electrostatic action (an electrostatic test), and measurement of the number of beads with air-blow (an air-blow test) after execution of the electrostatic test were executed before and after execution of the wiping test.

1-1. Contact Angle Measurement

The contact angle of purified water by the drop method was measured using a contact angle meter ("CA-D type" produced by Kyowa Interface Science Co., Ltd.).

1-2. Electrostatic Test

After the surface of inorganic thin film 2 was rubbed with BEMCOT® (made of 100% cellulose) to make 30 reciprocations while applying weight of 1 kg (after waiting period of 60 seconds), the surface was delicately brought into contact with polyethylene beads (average particle size of 10 μm). Then, after stopping the surface with the beads attached thereto for 10 seconds in the condition of facing downward, a 3 mm×2.3 mm area of the surface is observed under a microscope to count the beads attached thereto. The count was executed in ten different areas, and the average thereof was determined as the amount of attachment. In the measurement environment, the moisture was 55%±5%, and the temperature was 25° C.±3° C. It should be noted that the measurement was executed so that the surface of the multilayer film and the human body come into electrical contact with each other.

1-3. Air-Blow Test

After execution of the electrostatic test, the distance between an air gun and the surface of each of the samples provided with the inorganic thin films was set to 50 cm, and after blowing the surface with dry air at 0.1 MPa for 10 seconds, the beads remaining on (attached to) the surface were counted. In the measurement environment, the moisture was 55%±5%, and the temperature was 25° C.±3° C.

2. Surface Resistance (Sheet Resistance) Measurement

Figure 3:
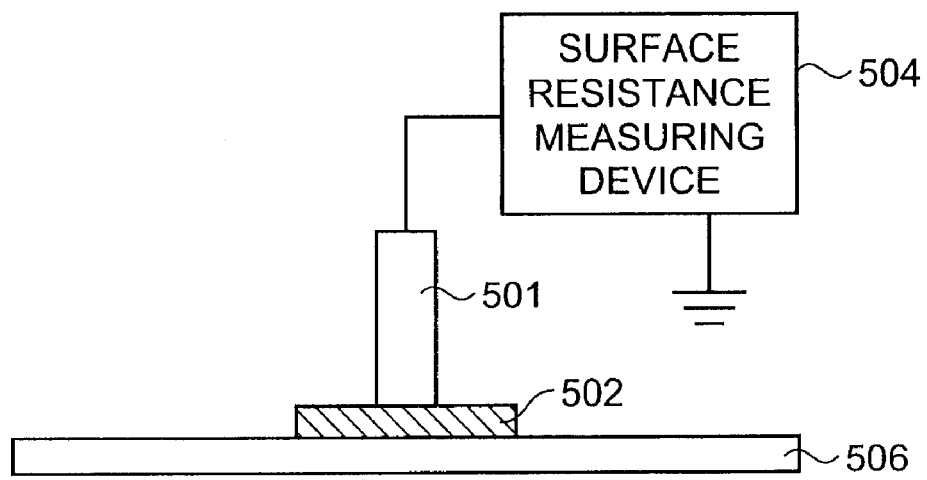
FIG. 3 is an explanatory diagram showing a condition of measuring a surface resistance of a sample.

The surface resistance of each of the samples was measured. FIG. 3 is an explanatory diagram showing a condition of measuring the surface resistance of each of the samples.

In FIG. 3, the measurement of the surface resistance was executed using a surface resistance measuring device (Hiresta UP MCP-HT45 produced by Mitsubishi Chemical Analytech Co., Ltd.) 504. The surface resistance measuring device 504 has a probe 501 having contact with the surface of the sample 502. A stage 506 mounting the sample 502 is made of Teflon®. The measuring conditions were 1000V, 30 sec. In the measurement environment, the moisture was 55%±5%, and the temperature was 25° C.±3° C.

3. Surface Potential Measurement

The surface of each of the samples provided with the inorganic thin film was rubbed hard with BEMCOT® (made of 100% cellulose), and was provided with electrostatic charge so as to have an initial surface potential of 2000V, and then the surface potential of each of the inorganic thin films was measured 60 seconds layer.

Figure 4:
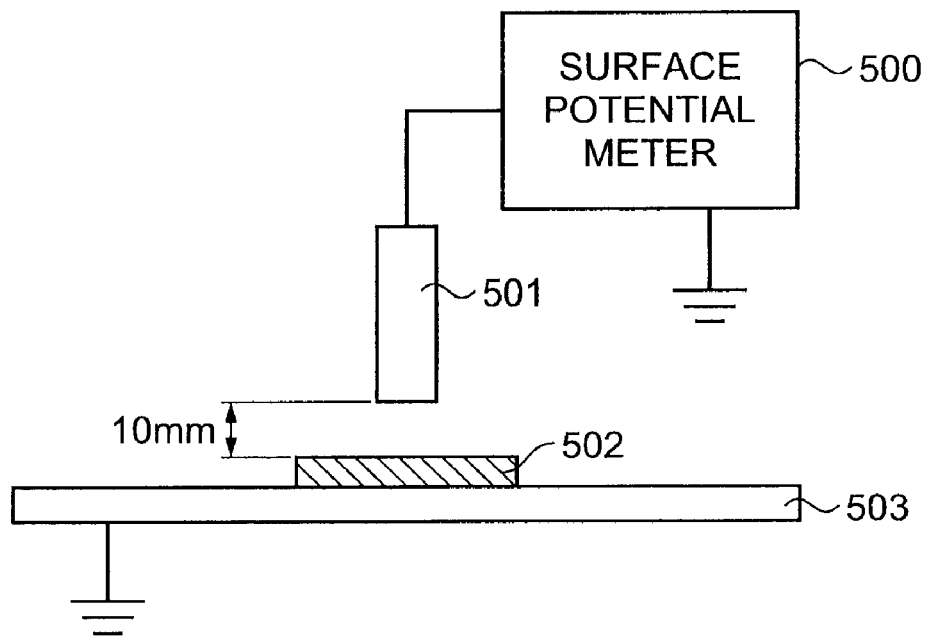
FIG. 4 is an explanatory diagram showing a condition of measuring a surface electrical potential of a sample.

FIG. 4 is an explanatory diagram showing a condition of measuring the surface potential of each of the samples.

In FIG. 4, the measurement of the surface potential was executed using a surface potential meter (Model 341 produced by TREK Japan K. K.) 500. The measurement with the surface potential meter 500 was executed with the distance between the probe 501 and the sample 502 set to 10 mm. It should be noted that the stage 503 for mounting the sample 502 is made of metal, and the measurement was executed in the condition of grounding the stage 503. In the measurement environment, the moisture was 55%±5%, and the temperature was 25° C.±3° C.

It should be noted that in the measurement of the density of the $SiO_2$ layer of the most superficial layer executed in addition to the evaluation items described above, the $SiO_2$ films were formed on the Si wafer to have a thickness of about 200 nm under the conditions of forming the respective $SiO_2$ layers of the most superficial layers, and then the density of each of the $SiO_2$ films was measured by Grazing Incidence X-ray Reflectively (GIXR) measuring device (ATX-G produced by Rigaku Corporation).

FIG. 5 shows the evaluation results in the wiping test (the contact angle measurement, the electrostatic test, and the air-blow test), the surface resistance (sheet resistance) measurement, and the surface potential measurement together with the measurement of the density of the $SiO_2$ layer of the most superficial layer in conjunction with the conditions of forming the inorganic thin films of the specific examples 1 through 6 and the comparative examples 1 through 18, respectively.

In FIG. 5, the film density of the $SiO_2$ films formed with assistance of the Ion gun (the IAD method, in the comparative examples 4 through 6, and 16 through 18) exceeds the theoretical density of 2.2 $g/cm^3$. This thought to be caused by implantation of O (oxygen) atoms by the assistance. In the case in which the output of the ion gun is set to 0 (zero), the density is lowered. Further, the density depends also on the pressure (the degree of vacuum) of the film formation, and the higher the pressure is, the lower the density becomes. The reason therefore is thought to be that the average free path length of the evaporated particles increases as the pressure decreases, and therefore, the amount of energy the particle has when the particle reaches the substrate becomes larger. It should be noted that in the present evaluation test 1, under the pressure higher than in the case of the specific example 6, the film formation rate was lowered, and failed to keep the typical allowable film formation rate of 0.8 nm/sec.

The number of beads attached to the sample measured prior to the wiping test was 100 through 300 in the specific examples 1 through 6, and 500 through 600 in the comparative examples 4 through 6 and 16 through 18. As shown in the drawing, it is understood that the number of beads attached to the surface is smaller in the specific examples 1 through 6 in comparison with the comparative examples 4 through 6 and 16 through 18.

This is caused by the difference in the density of the $SiO2$ layer of the most superficial layer in the inorganic thin film 2, and in the case with the specific examples 1 through 6 having low density of the $SiO2$ layer of the most superficial layer, since the sheet resistance is low and the surface potential is also low, the phenomenon described above is thought to be caused by the difference in the amount of electrostatic charge. Therefore, even in the cases of the comparative examples 7 through 12 without the fluorinated organic silicon compound films, there is no substantial difference from the specific examples 1 through 6 in the number of beads attached to the surface.

Then, the case in which the air-blow test was executed to the samples with the beads attached thereto will be considered.

In the specific examples 1 through 6, the number of the beads attached to the surface counted after the air-blow test was executed was 10 through 30, which showed rapid decrease in the number of beads attached to the surface. In contrast, in the comparative examples 7 through 12, the number of beads attached to the surface was larger than in the case with the specific examples 1 through 6 although decreased through the air-blow test. This depended on whether or not the fluorinated organic silicon compound film was provided on the surface, and in the specific examples 1 through 6 provided with the fluorinated organic silicon compound film, the ability to hold the beads was low because the amount of the surface energy was small, and therefore, the beads once attached to the surface could easily be eliminated. In contrast, in the comparative examples 7 through 12 without the fluorinated organic silicon compound film, the ability to hold the beads was high because the amount of the surface energy was large, and therefore, it was not easy to eliminate the beads once attached to the surface. This is also obvious from the measurement result of the contact angle, and the specific examples show the contact angles in the range of 107 through 110°, while the comparative examples 7 through 12 show the contact angles in the range of 42 through 49°. Further, since there is no substantial difference between the both parties in the sheet resistance and the surface potential, it is understood that the difference was not caused by the amount of the electrostatic charge. Further, the same reason is applicable to the fact that the number of beads attached to the surface measured after the air-blow test was smaller in the comparative examples 4 through 6 in comparison with the comparative examples 16 through 18.

From the fact described above, it can be said that the density of the $SiO_2$ layer of the most superficial layer forming the inorganic thin film 2 is preferably in the range of 1.9 through 2.1 $g/cm^3$. This is because the density of the $SiO_2$ film in the specific example 6 is 1.981 $g/cm^3$, and exceeds the theoretical density of the $SiO_2$ film of 2.2 $g/cm^3$ (the comparative examples 4 through 7 and 16 through 18) formed by the IAD method.

Further, there is no substantial difference in the sheet resistance and the surface potential between the specific examples 1 through 6 and the comparative examples 7 through 12, or between the comparative examples 4 through 6 and the comparative examples 16 through 18. Therefore, the fluorinated organic silicon compound films do not affect the electricity removing effect by the reduction of the density of the $SiO_2$ layers.

As described above, in order for preventing dust from adhering to the surface, it is effective to reduce the density of the $SiO_2$ layer of the most superficial layer of the inorganic thin film 2, thereby removing the electrostatic charge, and further, it is also effective to form the fluorinated organic silicon compound film on the surface so that the dust once attached to the surface can easily be eliminated therefrom.

In the case with the specific examples 1 through 6, there is no substantial difference in the level of the number of beads attached thereto, the level of the number of beads attached thereto after the air-blow test, and the contact angle between before and after the wiping test. In contrast, in the case with the comparative examples 4 through 6, the contact angles decrease significantly from before to after the wiping test, and the number of beads attached thereto after executing the air-blow test increases accordingly. Therefore, in the case with the specific examples 1 through 6, it is understood that the fluorinated organic silicon compound films are highly durable.

Evaluation Test 2

In the evaluation test 2, samples having the $SiO_2$ layers including the $TiO_2$ layers formed with lower density under the $SiO_2$ layer of the most superficial layer forming the inorganic thin film 2 were formed based on the results (i.e., the density of the $SiO_2$ layer of the most superficial layer forming the inorganic thin film 2 was preferably in the range of 1.9 through 2.1 $g/cm^3$) obtained in the evaluation test 1, and the performance evaluation thereof was conducted. The low-density $SiO_2$ layer of the most superficial layer, the low-density $TiO_2$ layer formed in the lower layer thereof, and the low-density $SiO_2$ layer formed in the lower layer thereof form a low-density formation section.

Firstly, prior to the evaluation test 2, the evaluation of the adhesion of each of the low-density $SiO_2$ layer and the low-density $TiO_2$ layer is executed.

In the evaluation of the adhesion of the low-density $SiO_2$ layer, the $TiO_2$ layer with a thickness of about 100 nm was formed on the surface of a white plate glass with a diameter of 30 mm, and a thickness of 0.3 mm under the standard conditions of the $TiO_2$ layer described above, and on the surface thereof, a low-density $SiO_2$ layer with a thickness of 100 nm was formed under the same film formation conditions (see FIG. 5) as in the specific examples 1 through 6 in the evaluation test 1, respectively, to form 6 samples. Therefore, the densities of the $SiO_2$ layers thus formed were the same as those of the specific examples 1 through 6 (see FIG. 5). The samples thus formed are referred to as samples 1 through 6 in the order of the formation conditions corresponding to the specific examples 1 through 6.

On the other hand, in the evaluation of the adhesion of the low-density $TiO_2$ layer, the white plate glass with a diameter of 30 mm, and a thickness of 0.3 mm was also used, the $SiO_2$ film with a thickness of 100 nm was formed under the standard conditions of the $SiO_2$ layer described above, and on the surface of the $SiO_2$ film, a sample provided with the $TiO_2$ layer with a thickness of about 100 nm formed under the standard conditions of the $TiO_2$ layer as a comparative sample, and four samples provided with the low-density $TiO_2$ layers with thicknesses of about 100 nm formed under the conditions in which the acceleration voltage and the acceleration current of the ion gun were set to 0 (zero), and the degree of vacuum in the film formation device was 0.014 Pa, 0.030 Pa, 0.040 Pa, and 0.050 Pa, respectively, totally 5 samples were formed. In other words, the low-density $TiO_2$ layer was formed by the vacuum evaporation method other than the ion-assisted deposition. It should be noted that the $TiO_2$ layer formed by the vacuum evaporation method other than the ion-assisted deposition becomes a $TiO_2$ layer with lower density compared to the $TiO_2$ layer formed using the ion-assisted deposition method.

The samples thus formed are referred to as samples 11 through 15 in this order.

The cross-cut tape test compliant with JIS K5600-5-6 was executed on the samples 1 through 6 and the samples 11 through 15 to evaluate the adhesion of the $SiO_2$ film and the $TiO_2$ film. In the cross-cut tape test, cuts were provided on the surfaces of the SiO2 films and the TiO2 films formed on the surfaces of the respective samples in the horizontal and the vertical directions at intervals of 1 mm (the cross cuts with a hundred grids) using a cutter, an adhesive tape was attached on the surface, and then the adhesive tape is peeled from the surface. On this occasion, the resulted film exfoliation was evaluated with the following three stages of evaluation standards.

A: Edges of the cross-cuts were completely smooth, and no exfoliation occurred in any grid.
B: Minor exfoliation of the film was observed at the intersections of the cross-cuts (5% or less of the 100 grids).
C: The film was exfoliated along the edges of the cross cuts, at the intersections of the cross-cuts, or both along the edges and at the intersections of the cross-cuts (more than 5% and less than 15% of the 100 grids).

FIG. 6 shows results of the evaluation of the adhesion of the samples 1 through 6 provided with the $SiO_2$ layers in conjunction with the conditions of forming the films. FIG. 7 shows results of the evaluation of the adhesion of the samples 11 through 15 provided with the $TiO_2$ layers in conjunction with the conditions of forming the films.

In FIG. 6, all of the samples 1 through 6 provided with the low-density $SiO_2$ layers formed on the surface thereof show preferable adhesion (A) independently of the film formation conditions.

On the other hand, in the case with the $TiO_2$ layers, the adhesion is lowered as the density of the $TiO_2$ film is lowered. Further, since the result of the evaluation of the adhesion of the sample 13 is A, it can be said that the density of the $TiO_2$ film used as the low-density $TiO_2$ layer is preferably no lower than 4.1 $g/cm^3$. Further, the density of the $TiO_2$ film in the sample 11, which has the high-density $TiO_2$ film formed using the ion-assisted deposition, is 4.89 $g/cm^3$. Although this value of the density can be made higher by changing the conditions of, for example, the ion assistance, the higher density causes increase in the compression stress and degradation in haze value (transparency), and therefore, is not preferable. Therefore, it can be said that the preferable range of the density in the low-density $TiO_2$ layer is 4.1 through 4.8 $g/cm^3$.

In the light of the results described above, using the formation conditions (the acceleration voltage and the acceleration current of the ion gun are 0 (zero), the degree of vacuum is 0.014 Pa) in, for example, sample 12 as the formation conditions of the low-density $TiO_2$ layer formed directly beneath the $SiO_2$ layer of the most superficial layer, and using the same formation conditions (the acceleration voltage and the acceleration current of the ion gun are 0 (zero), the degree of vacuum is 0.003 Pa) as those of the specific example 3 as the formation conditions of the low-density $SiO_2$ layers formed directly beneath that layer and including the $SiO_2$ layer of the most superficial layer, and new sample was formed.

Defining the low-density $SiO_2$ layer (2L30) of the most superficial layer of the inorganic thin film 2 (see FIG. 1) of the totally 60 layers composed of the TiO$_2$ layers formed under the standard conditions and the SiO$_2$ layers formed under the standard conditions stacked sequentially and alternately, and the low-density SiO$_2$ layer as the most superficial layer as a first layer, four samples formed by replacing the respective number of pairs of the TiO$_2$ layer and the SiO$_2$ layer in a range from the second layer (2H30) directly beneath the first layer to the sixth layer (2H28) with the corresponding number of pairs of the low-density TiO$_2$ layer and the low-density SiO$_2$ layer, and a sample having all of the layers (the 60 layers including the low-density SiO$_2$ layer of the most superficial layer) forming the inorganic thin film 2, formed of the low-density TiO$_2$ layers and the SiO$_2$ layers were formed as the samples.

In other words, the sample having one layer in the low-density formation section has the low-density SiO$_2$ layer in the most superficial layer (2L30). This sample is the same as the specific example 3 in the evaluation test 1. The sample having two layers in the low-density formation section has the low-density SiO$_2$ layer in 2L30, and the low-density TiO$_2$ layer in 2H30. Further, the sample having three layers in the low-density formation section has the low-density SiO$_2$ layers in 2L30 and 2L29, and the low-density TiO$_2$ layer in 2H30. In the same manner, the samples were formed while increasing sequentially the number of layers of the low-density formation section formed of the low-density SiO$_2$ layers and the low-density TiO$_2$ layers up to six. Further, the sample with 60 low-density layers had the low-density SiO$_2$ layers in 2L30 through 2L1, and the low-density TiO$_2$ layers in 2H30 through 2L1.

In the samples having the inorganic thin films thus formed, the sample having one layer in the low-density formation section is referred to as the specific example 3, the samples having the 2 through 6 layers, and 60 layers are referred to as samples 21 through 26 in this order.

In the formation of the samples, similarly to the case with the evaluation test 1, after forming the inorganic thin film on the surface of the white plate glass with a diameter of 30 mm, and a thickness of 0.3 mm, the fluorinated organic silicon compound film was formed on the surface thereof.

It should be noted that assuming that the refractive index (n) of the SiO$_2$ layer in the low-density formation section is 1.43, the refractive index (n) of the TiO$_2$ layer in the low-density formation section is 2.28, and the designed wavelength λ is 550 nm, the physical film thicknesses of the respective SiO$_2$ layers in the low-density formation section and the TiO$_2$ layers in the high-density formation section provided to each of the samples will be described below (the optical film thicknesses are described in the film thickness configuration of the inorganic thin film 2 described above).

The first layer (2L30): 62.8 nm, the second layer (2H30): 50.6 nm, the third layer (2L29): 31.7 nm, the fourth layer (2H29): 50.9 nm, the fifth layer (2L28): 32.2 nm, the sixth layer (2H28): 51.4 nm.

Therefore, the total thicknesses of the low-density formation sections are, in the order of the number of layers, namely from one (the specific example 3) to six (the sample 25), and further 60 (the sample 26), 62.8 nm, 113.4 nm, 145.2 nm, 196.0 nm, 228.3 nm, 279.7 nm, and 4374.6 nm, respectively.

Further, the performance evaluations of the samples 21 through 26 were executed similarly to the case with the evaluation test 1 with the evaluation items of the wiping test (the contact angle measurement, the electrostatic test, and the air-blow test), the surface resistance (sheet resistance) measurement, and the surface potential measurement.

FIG. 8 is a diagram showing the evaluation results of the evaluation test 2.

FIG. 8 shows the evaluation results in the wiping test, the surface resistance (sheet resistance) measurement, and the surface potential measurement executed on the samples 21 through 26 in conjunction with the conditions of forming the inorganic thin film of the respective samples, and including the evaluation results of the specific example 3 in the evaluation test 1 and measurement values of the densities of the low-density SiO$_2$ layers and the low-density TiO$_2$ layers provided thereto.

In FIG. 8, the sheet resistance decreases as the number of low-density layers increases. However, in the case the number of low-density layers is equal to or larger than four, the sheet resistance hardly changes.

Figure 9:
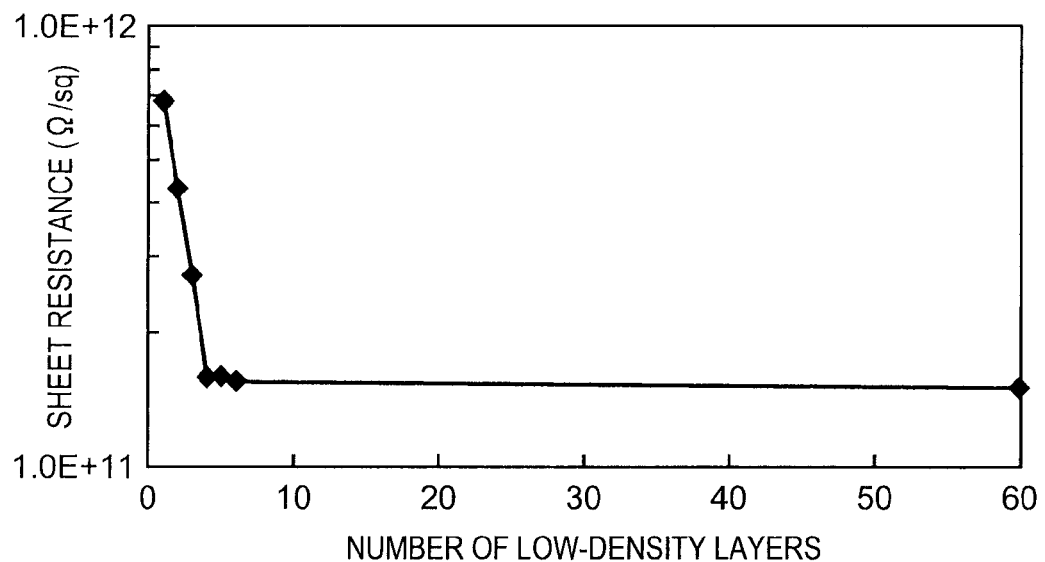
FIG. 9 is a graph showing a relationship between the number of layers of the low-density formation section and the sheet resistance in the evaluation test 2.
Figure 10:
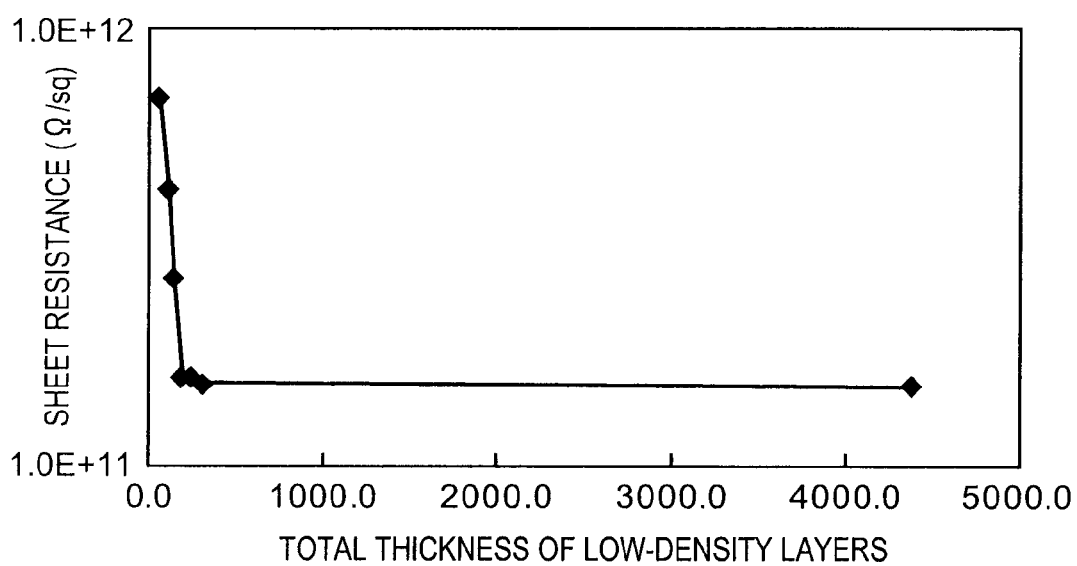
FIG. 10 is a graph showing a relationship between the total film thickness of the low-density formation section and the sheet resistance in the evaluation test 2.

FIG. 9 is a graph showing the relationship between the number of layers in the low-density formation section and the sheet resistance in the evaluation test 2, and FIG. 10 is a graph showing the relationship between the total thickness of the low-density formation section and the sheet resistance in the evaluation test 2.

In FIG. 9, the horizontal axis represents the number of layers in the low-density formation section, and the vertical axis represents surface resistivity (Ω/sq), and the plots of the sheet resistance values in the specific example 3 (the number of layers in the low-density formation section is one), and the samples 21 through 26 (the numbers of layers in the low-density formation section are two through 6, and 60, respectively) are connected by the lines to form a line graph. In FIG. 10, the horizontal axis represents the total thickness of layers in the low-density formation section, and the vertical axis represents surface resistivity (Ω/sq), and the plots of the sheet resistance values in the specific example 3 and the samples are connected by the lines to form a line graph.

The line graph shown in FIG. 9 prominently represents that in the area where the number of layers in the low-density formation section is equal to or larger than four, the sheet resistance value is saturated, and hardly varies. Subsequently, evaluations of the variation in the wavelength spectral characteristic with time in the case in which the number of layers in the low-density formation section is one (the specific example 3), in the case in which the number of layers in the low-density formation section is four (the sample 23), and in the case in which the all of the 60 layers are included in the low-density formation section (the sample 26) out of these samples were executed. The wavelength spectral characteristic was measured using an integrating sphere spectral transmission meter.

Figure 11:
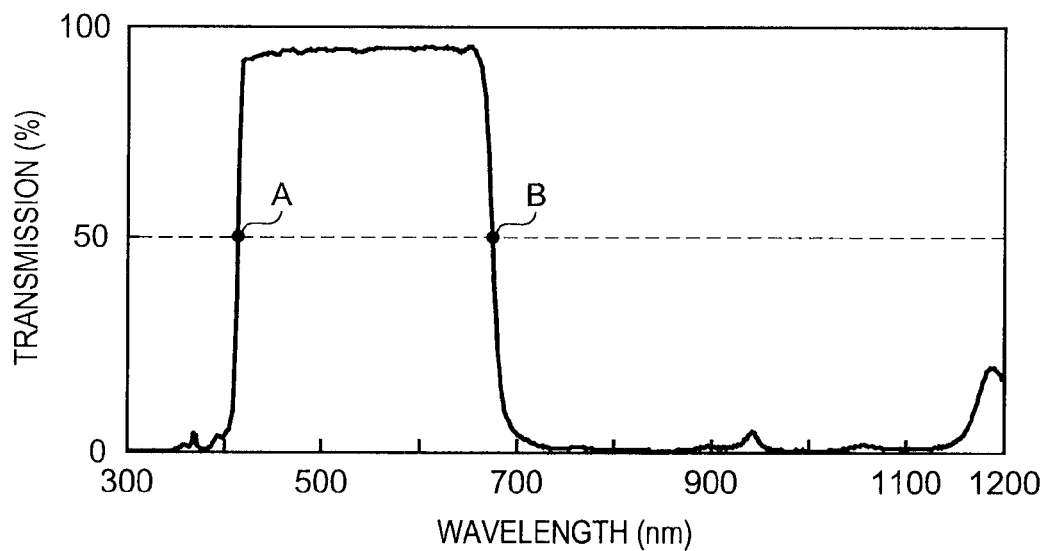
FIG. 11 is a graph showing a wavelength spectral characteristic in the specific example 3 in the evaluation test 1.

FIG. 11 is a graph showing the wavelength dispersion characteristic in the specific example 3 in the evaluation test 1. FIG. 11, has the horizontal axis representing the wavelength (nm), and the vertical axis representing the transmission (%), and shows a line graph plotting the transmission in every 2 nm of the wavelength in the wavelength spectral from 300 nm to 1200 nm (from the visible light region to a part of the near infrared light region).

Therefore, the inorganic thin films provided to the specific example 3, samples 23 through 26 all have an IR cut function.

In the evaluation of the variation with time, in the line graph shown in FIG. 11, the wavelengths of the samples at the half maximum (50% transmission) on the ultraviolet (UV) ray side denoted with a point A, and at the half maximum (50% transmission) on the infrared (IR) ray side denoted with a point B were measured immediately after the films were formed and after 30 days passed from when the films were formed.

Figure 12:
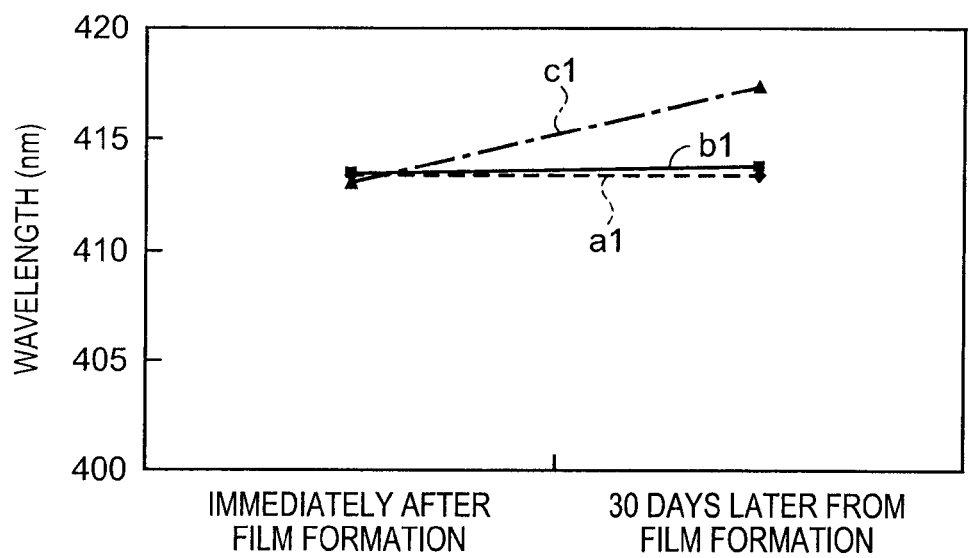
FIG. 12 is a graph showing the variation over time in the wavelength at half maximum on the UV side.

FIG. 12 is a graph showing the variation over time in the wavelength at the half maximum on the UV side.

The line graph a1 illustrated with the broken line in FIG. 12 shows the variation over time in the specific example 3 (with one layer in the low-density formation section), the line graph b1 illustrated with the solid line shows the variation over time in the sample 23 (with four layers in the low-density formation section), and the line graph c1 illustrated with the dashed line shows the variation over time in the sample 26 (all the 60 layers are included in the low-density formation section).

Figure 13:
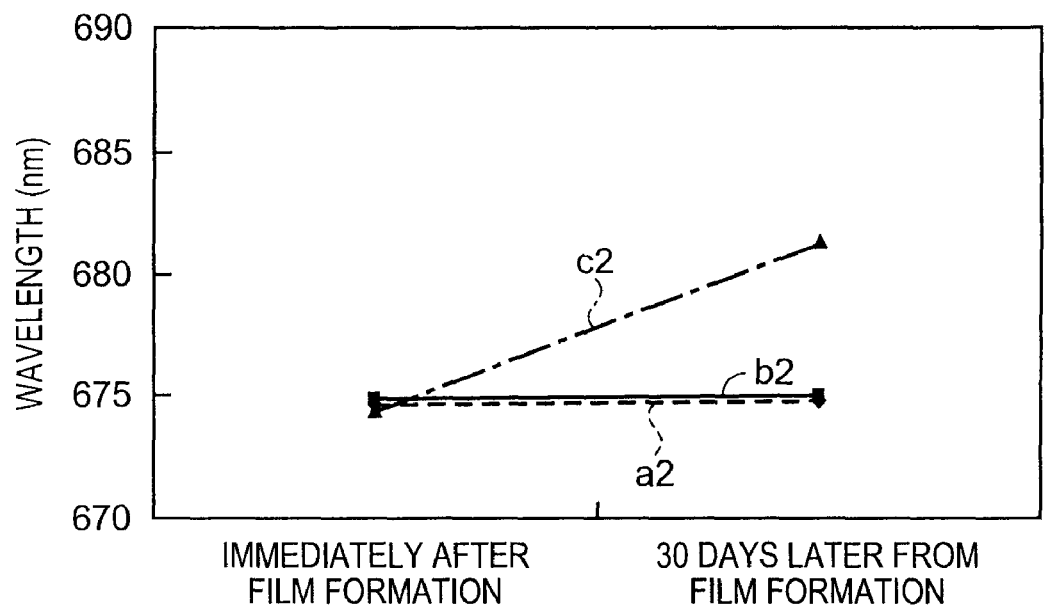
FIG. 13 is a graph showing the variation over time in the wavelength at half maximum on the IR side.

On the other hand, FIG. 13 is a graph showing the variation over time in the wavelength at the half maximum on the IR side, and the line graph a2 illustrated with the broken line in FIG. 13 shows the variation over time in the specific example 3, the line graph b2 illustrate with the solid line shows the variation over time in the sample 23, and the line graph c2 illustrated with the dashed line shows the variation over time in the sample 26.

It should be noted that the vertical axis of FIG. 12 represents the wavelength range of 400 through 420 nm, and the vertical axis of FIG. 13 represents the wavelength range of 670 through 690 nm.

In FIGS. 12 and 13, the variation over time in the wavelength at the half maximum on the UV side and the variation over time in the wavelength at the half maximum on the IR side become large as the number of the low-density layers increases. Therefore, since the variation in the half maximum frequencies hardly occurs in both cases in the case in which the number of the layers in the low-density formation section is no larger than four as illustrated with the line graphs b1 and b2, and the sheet resistance is saturated in the case in which the number of the layers in the low-density formation section is four (see FIG. 9), it can be said that the number of layers in the low-density formation section is preferably in a range of 1 through 4. In other words, it can be said that it is preferable, assuming that the $SiO_2$ layer of the most superficial layer as the first layer, to adopt the inorganic thin film 2 having at least the most superficial layer formed of the low-density $SiO_2$ layer, or to selectively form the $SiO_2$ layer of the most superficial layer and the $TiO_2$ layers and the $SiO_2$ layers formed in the second through fourth layers with the low-density formation section. In other words, assuming that the $SiO_2$ layer of the most superficial layer as the first layer, it is preferable to selectively form the low-density formation section in the first through fourth layers.

On the other hand, from the line graph shown in FIG. 10, in other words from the viewpoint of the total thickness of the low-density formation section, it can be said that the total thickness (the physical thickness) of the low-density formation section is preferably within 280 nm including the thickness of the $SiO_2$ layer of the most superficial layer and in the direction towards the lower layer.

In the embodiment described above, although the explanations are presented using the white plate glass as the glass substrate 1, this is not a limitation, but a transparent substrate made of a material such as BK7, sapphire glass, borosilicate glass, soda-lime glass, SF3, or SF7 can be used as the glass substrate 1, and further, an optical glass offered commercially for the public can also be adopted. Further, although the explanation is presented in the case of using $TiO_2$ as the material of the high-refractive-index layers, $Ta_2O_5$ or $Nb_2O_5$ can also be used instead.

Further, although the fluorinated organic silicon compound film 5 is formed on the $SiO_2$ layer (2L30) of the most superficial layer of the inorganic thin film 2, alkyl compounds (e.g., KF-96 produced by Shin-Etsu Chemical Co., Ltd) can also be used as the water-repellent film, and the substantially the same advantage as in the embodiment described above can be obtained.

As described hereinabove, according to the present embodiment, by setting the density of at least the $SiO_2$ layer (2L30) forming the most superficial layer of the inorganic thin film 2 to the range of 1.9 through 2.1 $g/cm^3$, the insulating property of the $SiO_2$ layer, which shows a high insulating property by nature, is lowered (the electrical conductivity is increased). Therefore, it becomes possible for the charge caused on the surface by, for example, electrostatic action to reach the lower layer via the $SiO_2$ layer of the most superficial layer. Since the high-refractive-index material in the lower layer has an insulating property lower than that of the $SiO_2$ layer, the charge can migrate on the surface of the high-refractive-index film. By grounding the charge, it becomes difficult for the charge to accumulate on the most superficial surface of the optical multilayer filter, thus it becomes difficult for dust caused by electrostatic action to adhere to the surface.

Further, since the fluorinated organic silicon compound film 5 is formed on the $SiO_2$ layer (2L30) forming the most superficial layer of the inorganic thin film 2, an mount of the surface energy is reduced, thus the dust is prevented from adhering to the surface, and further, it becomes possible to easily eliminate the dust once attached to the surface. Further, since the fluorinated organic silicon compound film 5 thus formed is thin (<10 nm), and has a lower density compared to inorganic materials, it can easily conduct the charge to the lower layer, and have no influence on the spectral characteristic.

Further, if the density of the $SiO_2$ layer of the most superficial layer in the inorganic thin film 2 is low, the surface area of the $SiO_2$ layer is increased (equivalent to increasing concavity and convexity microscopically), and the area to which the fluorinated organic silicon compound film 5 is attached is increased. Therefore, the adhesion of the fluorinated organic silicon compound film 5 is enhanced, and the durability of thereof is improved.

Still further, assuming that the $SiO_2$ layer of the most superficial layer of the inorganic thin film 2 is the first layer, by selectively forming the $TiO_2$ layer with a density of 4.1 through 4.8 $g/cm^3$ as the second layer (2H30) directly beneath the $SiO_2$ layer (2L30) of the first layer and as the fourth layer (2H29), and the $SiO_2$ layer with a density of 1.9 through 2.1 $g/cm^3$ as the third layer (2L29), substantially the same advantage can be obtained, and further, the optical multilayer filter with small variation over time in the wavelength dispersion characteristic can be obtained.

Further, since other layers than the first layer (2L30), the $TiO_2$ layers formed as the second layer (2H30) and the fourth layer (2H29), and the $SiO_2$ layer formed as the third layer (2L29) in the inorganic thin film 2 can be formed as high-quality films, the characteristics necessary for the optical multilayer filter, such as low-wavelength shift or low haze can easily be obtained.

Further, in the optical multilayer filter 10 of the present embodiment, since the substrate is formed of the glass substrate 1, there can be obtained the optical multilayer filter including, for example, functions of the UV-IR cut filter and the IR cut filter configured as dust-proof glass having a dust repellent property for, for example, imaging element such as a charge-coupled device (CCD), and moreover integrated with a desired filter function. Further, since the glass substrate 1 is formed of a quartz substrate, there can be obtained the optical low-pass filter including, for example, the functions of the VU-IR cut filter and the IR cut filter configured as, for example, an optical low-pass filter having a dust repellent property, and moreover integrated with a desired filter function. Further, the present embodiment can also be applied to formation of an antireflection film.

Further, according to the method of manufacturing the optical multilayer filter of the present embodiment, the $SiO_2$ layer with a density of 1.9 through 2.1 $g/cm^3$ can be obtained by forming at least the $SiO_2$ layer (2L30) configuring the most superficial layer of the inorganic thin film layer 2 by a vacuum evaporation method. Thus, the insulating property of the $SiO_2$ layer, which shows by nature a high insulating property, can be lowered (the electrical conductivity is enhanced). Therefore, it becomes possible for the charge caused on the surface by, for example, electrostatic action to reach the lower layer via the $SiO_2$ layer of the most superficial layer. Since the high-refractive-index material in the lower layer has an insulating property lower than that of the $SiO_2$ layer, the charge can migrate on the surface of the high-refractive-index film. By grounding the charge, it becomes difficult for the charge to accumulate on the most superficial surface of the optical multilayer filter 10, thus the optical multilayer filter difficult for dust caused by electrostatic action to adhere to the surface thereof can be obtained.

Further, by forming the $TiO_2$ layer to be formed in the layer directly beneath the $SiO_2$ layer (2L30) of the most superficial layer of the inorganic thin film 2 by a vacuum evaporation method, the $TiO_2$ layer with a density of 4.1 through 4.8 $g/cm^3$ can be obtained. Further, assuming that the $SiO_2$ layer (2L30) of the most superficial layer of the inorganic thin film 2 is the first layer, by selectively forming the $TiO_2$ layer to be formed in the second layer (2H30) directly beneath the $SiO_2$ layer of the first layer, and in the fourth layer (2H29) and the $SiO_2$ layer to be formed in the third layer (2L29) by a vacuum evaporation method, there can be obtained the optical multilayer filter having substantially the same advantage as in the case of forming at least the $SiO_2$ layer of the most superficial layer of the inorganic thin film 2 by a vacuum evaporation method.

Further, since the fluorinated organic silicon compound film 5 is formed on the $SiO_2$ layer forming the most superficial layer of the inorganic thin film 2, an mount of the surface energy is reduced, thus there can be obtained the optical multilayer filter capable of preventing the dust from adhering to the surface, and further, allowing the dust once attached to the surface to be eliminated easily. Further, since the film thickness of the fluorinated organic silicon compound film 5 thus formed is small, and has a lower density compared to inorganic materials, it can easily conduct the charge to the lower layer, and have no influence on the spectral characteristic. Further, if the density of the $SiO_2$ layer of the most superficial layer in the inorganic thin film 2 is low, the surface area of the $SiO_2$ layer is increased, and the area to which the fluorinated organic silicon compound film 5 is attached is increased. Therefore, the adhesion of the fluorinated organic silicon compound film 5 is enhanced, and the optical multilayer filter having the improved durability can be obtained.

Further, assuming that the $SiO_2$ layer (2L30) configuring the most superficial layer of the inorganic thin film 2 is the first layer, by setting the pressure when forming the $SiO_2$ layer of the first layer and the $SiO_2$ layer formed selectively in the third layer (2L29) below the $SiO_2$ layer of the first layer to $5 \times 10^{-4}$ through $5 \times 10^{-2}$ Pa, the density of 1.9 through 2.1 $g/cm^3$ can be obtained. Further, assuming that the $SiO_2$ layer (2L30) of the most superficial layer is the first layer, by setting the pressure when forming the $TiO_2$ layers to be formed selectively in the second layer (2H30) directly beneath the $SiO_2$ layer of the first layer and the fourth layer (2H29) to $1.4 \times 10^{-2}$ through $3 \times 10^{-2}$ Pa, the density of 4.1 through 4.8 $g/cm^3$ can be obtained.

The optical multilayer filter 10 thus manufactured by the method of manufacturing an optical multilayer filter according to the present embodiment can be leveraged as an electronic apparatus capable of suppressing the influence of dust including an imaging device such as a digital still camera or a digital video camera, a camera-equipped mobile phone, a camera-equipped personal computer, and so on.

An example of applying the optical multilayer filter to an imaging device of the digital still camera for performing imaging of still images among these electronic apparatuses will hereinafter be explained.

Figure 14:
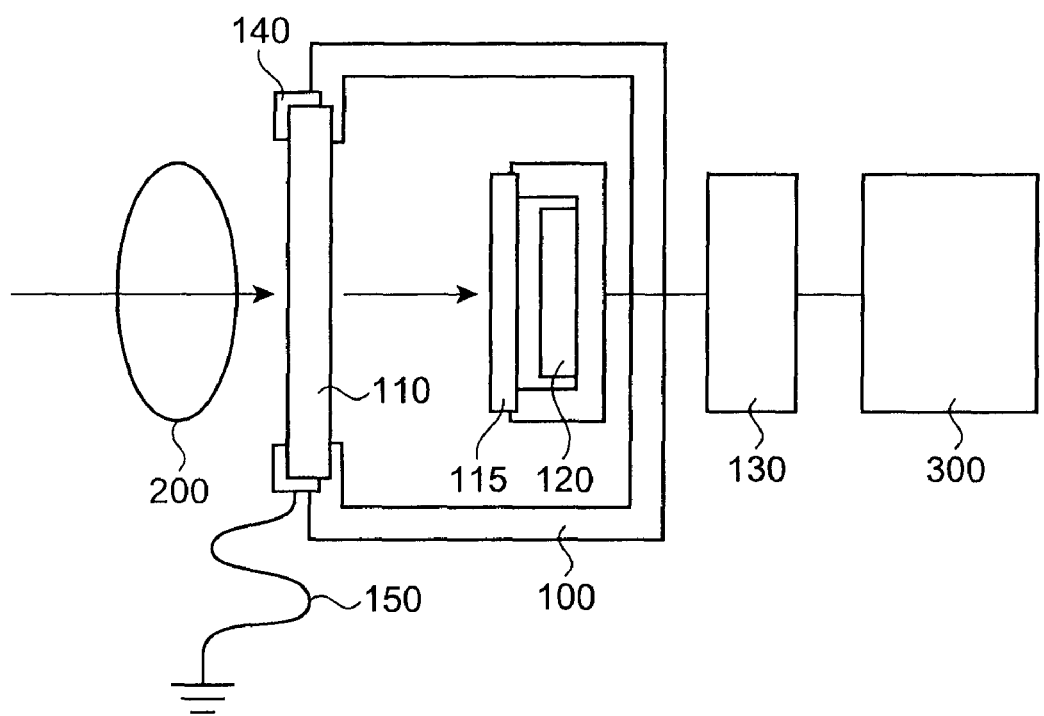
FIG. 14 is an explanatory diagram showing a configuration of a digital still camera using the optical multilayer filter according to the embodiment of the invention.

FIG. 14 is an explanatory diagram showing a configuration of the digital still camera using the optical multilayer filter according to the present embodiment, and shows an imaging module 100 and a configuration of imaging device including the imaging module 100.

The imaging module 100 is configured including a cover glass 115, an optical low-pass filter 110, and a charge-coupled device (CCD) 120 as an imaging element for electrically converting the optical image.

The optical low-pass filter 110 has the $SiO_2$ layer (2L30) for configuring the most superficial layer of the inorganic thin film 2 (see FIG. 1) on the surface thereof, the $SiO_2$ layer having a density of 1.9 through 2.1 $g/cm^3$, and further, there is formed an UV-IR cut filter having the fluorinated organic silicon compound film 5 formed on the $SiO_2$ layer configuring the most superficial layer of the inorganic thin film 2. In this case, a quartz substrate is used as the substrate of the filter.

The optical low-pass filter 110 is a part having direct contact with the outside air when exchanging the lens of the digital still camera, and the part most likely to have dust attached thereto. A fixing tool 140 for fixing the optical low-pass filter 110 is formed of an electrically conductive material such as metal, and is electrically connected to the most superficial layer (surface) of the optical low-pass filter 110. Further, the fixing tool 140 is grounded with a grounding wire 150.

The imaging device is configured including the imaging module 100, a lens 200 disposed on the light entrance side, a drive section 130 for driving the CCD 120 of the imaging module 100, and a main body section 300 for performing recording and reproducing the imaging signal output from the imaging module 100. It should be noted that, although not shown in the drawing, the main body section 300 includes constituents such as a signal processing section for performing correction and so on of the imaging signal, a recording section for recording the imaging signal on a recording medium such as magnetic tapes, a reproduction section for reproducing the imaging signal, and a display section for displaying the picture thus reproduced. The digital still camera configured as described above can be provided as a digital still camera having the optical low-pass filter 110 with a surface, which has direct contact with the outside air and is likely to have dust attached thereto by nature, but actually is difficult for the dust to adhere thereto and allows the dust once attached thereto to be easily eliminated therefrom by air blow.

It should be noted that although the imaging module 100 having a structure of disposing the lens separated therefrom is explained, the imaging module can be configured to include the lens 200.

Further, the present embodiment can be applied to the antireflection film formed on the surface of the cover glass 115.

Further, it is also possible to put the present embodiment into practice by forming the multilayer filter on the surface of the cover glass 115.

Further, it is also possible to use the cover glass 115 made of a quartz material and having a function of a part of the optical low-pass filter. Further, it can be applied to the antireflection film or the multilayer filter (a UV-IR cut filter) formed on the surface thereof.

In the case in which the present embodiment is applied to the cover glass, the dust attached thereto in the manufacturing process of the imaging device can be reduced.

Further, the present embodiment can be put into practice even in the configuration of forming the antireflection film on the obverse side of the optical low-pass filter.

The entire disclosure of Japanese Patent Application Nos: 2007-297611, filed Nov. 16, 2007, 2008-201556 and filed Aug. 5, 2008 are expressly incorporated by reference herein.

What is claimed is:

1. An optical multilayer film filter having an inorganic thin film composed of a plurality of layers on a substrate, comprising:
    the inorganic thin film being constituted by a low-density formation section and a high-density formation section;
    a fluorinated organic silicon compound film being formed on a surface of the inorganic thin film;
    the low-density formation section being formed such that one of a most superficial layer of the inorganic thin film and a plurality of layers including the most superficial layer is formed of at least one of a low-density titanium oxide layer and a low-density silicon oxide layer;
    the high-density formation section being formed between the low-density formation section and the substrate by stacking silicon oxide layers with a density higher than the low-density silicon oxide and titanium oxide layers with a density higher than the low-density titanium oxide layer;
    a total film thickness of the low-density formation section being within 280 nm;
    density of the low-density silicon oxide layer being in a range of 1.9 through 2.1 $g/cm^3$;
    density of the low-density titanium oxide layer being in a range of 4.1 through 4.8 $g/cm^3$;
    the most superficial layer of the inorganic thin film being formed of the low-density silicon oxide layer; and
    the number of layers of the low-density formation section being formed by selecting one of two through four.

2. The optical multilayer film filter according to claim 1, the substrate being one of a glass substrate and a crystal substrate.

3. A method of manufacturing an optical multilayer film filter having an inorganic thin film composed of a plurality of layers on a substrate, the method comprising:
    forming, on a surface of the substrate, a high-density formation section in which a high-density titanium oxide layer and a high-density silicon oxide layer are stacked;
    next, forming, on a surface of the high-density formation section, at least one of a low-density titanium oxide layer having a density lower than the high-density titanium oxide layer and a low-density silicon oxide layer having a density lower than the high-density silicon oxide layer, by a vacuum deposition method, to form a low-density formation section that has a total thickness within 280 nm; and
    next, forming a fluorinated organic silicon compound film on a surface of a most superficial layer of the low-density formation section;
    density of the low-density silicon oxide layer being in a range of 1.9 through 2.1 $g/cm^3$;
    density of the low-density titanium oxide layer being in a range of 4.1 through 4.8 $g/cm^3$; and
    the number of layers of the low-density formation section being formed by selecting one of two through four.

4. A method of manufacturing an optical multilayer film filter having an inorganic thin film composed of a plurality of layers on a substrate, the method comprising:
    forming, on a surface of the substrate, a high-density formation section in which a high-density titanium oxide layer and a high-density silicon oxide layer are stacked;
    next, forming, on a surface of the high-density formation section, at least one of a low-density titanium oxide layer having a density lower than the high-density titanium oxide layer and a low-density silicon oxide layer having a density lower than the high-density silicon oxide layer, by a vacuum deposition method, to form a low-density formation section that has a total thickness within 280 nm; and
    next, forming a fluorinated organic silicon compound film on a surface of a most superficial layer of the low-density formation section;
    pressure applied when forming the low-density silicon layer by the vacuum deposition method being in a range of $5\times10^{-4}$ through $5\times10^{-2}$ Pa; and
    pressure applied when forming the low-density titanium layer by the vacuum deposition method being in a range of $1.4\times10^{-2}$ through $3\times10^{-2}$ Pa.

5. An electronic apparatus in which an optical multilayer film filter is incorporated, comprising:
    the optical multilayer film filter being constituted by an inorganic thin film composed of a plurality of layers on a substrate and a fluorinated organic silicon compound film formed on a surface of the inorganic thin film;
    the inorganic thin film being constituted by a low-density formation section and a high-density formation section;
    the low-density formation section being formed such that one of a most superficial layer of the inorganic thin film and a plurality of layers including the most superficial layer is formed of at least one of a low-density titanium oxide layer and a low-density silicon oxide layer;
    the high-density formation section being formed between the low-density formation section and the substrate by stacking silicon oxide layers with a density higher than the low-density silicon oxide and titanium oxide layers with a density higher than the low-density titanium oxide layer;
    a total film thickness of the low-density formation section being within 280 nm;
    density of the low-density silicon oxide layer being in a range of 1.9 through 2.1 $g/cm^3$;
    density of the low-density titanium oxide layer being in a range of 4.1 through 4.8 $g/cm^3$;and
    the number of layers of the low-density formation section being formed by selecting one of two through four.

6. An optical multilayer film filter having an inorganic thin film composed of a plurality of layers on a substrate, comprising:
    the inorganic thin film being constituted by a low-density formation section and a high-density formation section;
    a fluorinated organic silicon compound film being formed on a surface of the inorganic thin film;
    the low-density formation section being formed such that one of a most superficial layer of the inorganic thin film and a plurality of layers including the most superficial layer is formed of at least one of a low-density titanium oxide layer and a low-density silicon oxide layer;
    the high-density formation section being formed between the low-density formation section and the substrate by stacking silicon oxide layers with a density higher than the low-density silicon oxide and titanium oxide layers with a density higher than the low-density titanium oxide layer;

a total film thickness of the low-density formation section being within 280 nm;

density of the low-density silicon oxide layer being in a range of 1.9 through 2.1 g/cm$^3$;

density of the low-density titanium oxide layer being in a range of 4.1 through 4.8 g/cm$^3$;

the most superficial layer of the inorganic thin film being formed of the low-density silicon oxide layer;

the number of layers of the low-density formation section being formed by selecting one of two through four; and a thickness of the fluorinated organic silicon compound film being thinner than 10 nm.

7. A method of manufacturing an optical multilayer film filter having an inorganic thin film composed of a plurality of layers on a substrate, the method comprising:

forming, on a surface of the substrate, a high-density formation section in which a high-density titanium oxide layer and a high-density silicon oxide layer are stacked;

next, forming, on a surface of the high-density formation section, at least one of a low-density titanium oxide layer having a density lower than the high-density titanium oxide layer and a low-density silicon oxide layer having a density lower than the high-density silicon oxide layer, by a vacuum deposition method, to form a low-density formation section that has a total thickness within 280 nm; and next, forming a fluorinated organic silicon compound film on a surface of a most superficial layer of the low-density formation section;

density of the low-density silicon oxide layer being in a range of 1.9 through 2.1 g/cm$^3$;

density of the low-density titanium oxide layer being in a range of 4.1 through 4.8 g/cm$^3$; and the number of layers of the low-density formation section being formed by selecting one of two through four, wherein a thickness of the fluorinated organic silicon compound film is formed to be thinner than 10 nm.

8. An electronic apparatus in which an optical multilayer film filter is incorporated, comprising:

the optical multilayer film filter being constituted by an inorganic thin film composed of a plurality of layers on a substrate and a fluorinated organic silicon compound film formed on a surface of the inorganic thin film;

the inorganic thin film being constituted by a low-density formation section and a high-density formation section;

the low-density formation section being formed such that one of a most superficial layer of the inorganic thin film and a plurality of layers including the most superficial layer is formed of at least one of a low-density titanium oxide layer and a low-density silicon oxide layer;

the high-density formation section being formed between the low-density formation section and the substrate by stacking silicon oxide layers with a density higher than the low-density silicon oxide and titanium oxide layers with a density higher than the low-density titanium oxide layer;

a total film thickness of the low-density formation section being within 280 nm;

density of the low-density silicon oxide layer being in a range of 1.9 through 2.1 g/cm$^3$;

density of the low-density titanium oxide layer being in a range of 4.1 through 4.8 g/cm$^3$;

the number of layers of the low-density formation section being formed by selecting one of two through four; and a thickness of the fluorinated organic silicon compound film being thinner than 10 nm.

* * * * *